US009525979B2

(12) United States Patent
Cromack

(10) Patent No.: US 9,525,979 B2
(45) Date of Patent: Dec. 20, 2016

(54) REMOTE CONTROL OF SEPARATE AUDIO STREAMS WITH AUDIO AUTHENTICATION

(71) Applicant: Mark Robert Cromack, Santa Ynez, CA (US)

(72) Inventor: Mark Robert Cromack, Santa Ynez, CA (US)

(73) Assignee: COGI, Inc., Santa Barbara, CA (US)

( * ) Notice: Subject to any disclaimer, the term of this patent is extended or adjusted under 35 U.S.C. 154(b) by 0 days.

(21) Appl. No.: 14/604,740

(22) Filed: Jan. 25, 2015

(65) Prior Publication Data

US 2016/0219416 A1    Jul. 28, 2016

(51) Int. Cl.
| | | |
|---|---|---|
| H04H 40/00 | (2009.01) | |
| H04W 4/06 | (2009.01) | |
| H04L 29/06 | (2006.01) | |
| H04L 29/08 | (2006.01) | |
| H04W 76/02 | (2009.01) | |
| H04L 12/18 | (2006.01) | |
| H04M 3/42 | (2006.01) | |
| H04M 3/56 | (2006.01) | |
| G10L 15/30 | (2013.01) | |

(52) U.S. Cl.
CPC ............ H04W 4/06 (2013.01); H04L 12/1822 (2013.01); H04L 12/1831 (2013.01); H04L 65/4076 (2013.01); H04L 65/602 (2013.01); H04L 67/18 (2013.01); H04M 3/42221 (2013.01); H04M 3/568 (2013.01); H04W 76/02 (2013.01); G10L 15/30 (2013.01); H04M 2203/5009 (2013.01); H04M 2203/60 (2013.01)

(58) Field of Classification Search
USPC ........... 455/3.01–3.06; 381/104, 2; 340/4.37, 340/4.4; 379/41, 67.1, 51
See application file for complete search history.

(56) References Cited

U.S. PATENT DOCUMENTS

| | | | | |
|---|---|---|---|---|
| 7,668,721 B2 * | 2/2010 | Barkley | ............... | G10L 15/1822 704/235 |
| 7,809,568 B2 * | 10/2010 | Acero | ................ | G06F 17/30746 704/257 |
| 8,407,049 B2 * | 3/2013 | Cromack | .......... | G06F 17/30743 704/235 |
| 2001/0056351 A1 * | 12/2001 | Valentine | .......... | G06F 17/30017 704/270 |
| 2006/0188075 A1 * | 8/2006 | Peterson | ............... | H04M 3/487 379/67.1 |
| 2006/0205427 A1 | 9/2006 | Laible et al. | | |
| 2010/0106504 A1 | 4/2010 | Agrawal et al. | | |
| 2012/0245938 A1 * | 9/2012 | Bedingfield, Sr. | ......................... | G06F 17/30038 704/235 |
| 2013/0204618 A1 | 8/2013 | Henry | | |
| 2014/0232817 A1 | 8/2014 | Jones et al. | | |

FOREIGN PATENT DOCUMENTS

WO        2011/136794 A1    11/2011

* cited by examiner

*Primary Examiner* — Fayyaz Alam
(74) *Attorney, Agent, or Firm* — Mark Rodgers

(57) ABSTRACT

A process for remote control of audio streams, including capturing and digitizing a broadcasted audio stream for an event, sending the captured audio stream of the event to a server based program, providing control functions to users for processing the audio stream according to user preferences, providing Internet appliance applications to users for accessing the control functions on the server, and authenticating users to the server who are authorized to use the control functions on the server on the captured audio stream for the event.

8 Claims, 3 Drawing Sheets

REMOTE CONTROL OF SEPARATE AUDIO STREAMS WITH AUDIO AUTHENTICATION

BACKGROUND

The specification relates to capturing audio events such as speeches, lectures, meetings and others, and providing tools for identifying, embellishing and preserving portions of the event of interest to a listener/participant, and in particular to authentication of listener/participants for access to the captured event and the tools.

U.S. Pat. Nos. 8,407,049, 8,335,689, and 8,332,212, assigned to the common owner of this application and incorporated by reference, describe a system, termed COGI®, for allowing listener/participants, who are subscribers of the system, access to an audio event and a suite of tools to capture, review and share the "cogent ideas" (cogi) or important moments of audio events such as conversations, lectures, meetings and phone calls. This COGI® system may benefit from the ability to recognize, authenticate, and notify COGI® subscribers (users) who are in the presence of a COGI® audio event.

BRIEF DESCRIPTION

In some embodiments, a system may be provided that authenticates users in the presence of an audio event, where that event is captured and made available to users for identification and embellishment of portions of the audio event of interest to the user.

In some embodiments a process for remote control of audio streams may be provided, including capturing and digitizing a broadcasted audio stream for an event, sending the captured audio stream of the event to a server based program, digitizing the audio stream on the server and providing control functions to users for processing the audio stream according to user preferences, providing Internet appliance applications to users for accessing the control functions on the server, and authenticating users to the server who are authorized to use the control functions on the server on the captured audio stream for the event.

In some embodiments the control functions may include selecting portions of the audio stream for at least one of recording, video capture and transcription, annotating selected portions of the audio stream with additional data including comments, speaker identification, images, contact tags, hashtags, and metadata tags and, accessing from the server, selected and/or annotated data sets from the event at a later time.

In some embodiments authentication may include one or more of known user telephone numbers when the appliance is a mobile phone, user location, by way of locating methods including GPS, Bluetooth, cellular, local Wi-Fi address, compared to the known position of the event, when the mobile appliance has location finding capability, comparison of local captured audio signal characteristics with the audio stream at the server to verify the user is in audio range of the event, when the mobile appliance has audio capture and capability, or event originator authorization, including access codes.

In some embodiments the process may include capturing the audio stream on a speakerphone wherein the speakerphone is on a call to a phone in a second locality, acquiring the audio stream on the server through a telephone connection to the server, and broadcasting the audio stream at the second locality, and, allowing authentication of user appliances at the second locality to access the control functions on the server.

In some embodiments the phone call may be routed through the server by way of the event originator dialing into the server and the server dialing the destination user and the call connection is made through the server.

In some embodiments the process may include running the user appliance application in a background mode, and upon determining occurrence of an event in the user's vicinity, prompting the user with information about the event.

In some embodiments the process may include notifying a tagged user about the event and inviting that user to join if within range.

In some embodiments the process may include the audio stream being additionally acquired from one or more of the authenticated users' devices.

DETAILED DESCRIPTION OF ILLUSTRATIVE EMBODIMENTS

One or more embodiments described herein may provide for authentication, allowing users who subscribe to an audio capture and control system access to control of audio streams for audio events they are authorized for.

One or more embodiments described herein may provide for automatic identification and user notification of nearby audio events that are being captured by an audio capture and control system for which the user is a subscriber.

One or more embodiments may provide for originators of an audio event to provide authorization to selected users for access and control of audio capture.

The processes described herein reside in one or more programs, applications, or program logic stored and executing on servers, PEDs and other computing devices.

Figure 1:
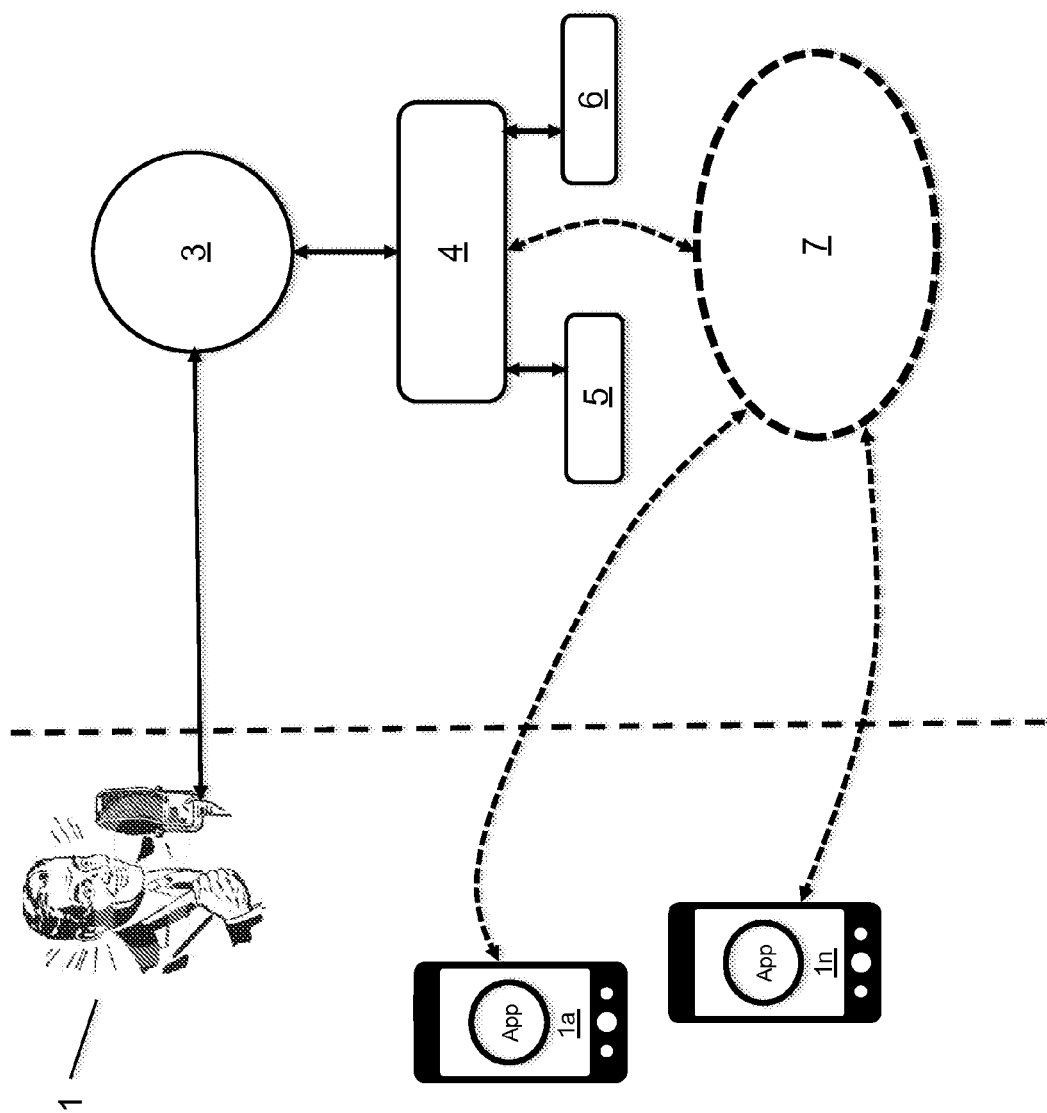
FIG. 1 is a block diagram of one COGI® scenario according to an illustrative embodiment of the invention.

Referring to FIG. 1 an illustrative scenario is shown, which is representative of a single location event, such as a lecture, speech, round table discussion or the like. An audio event 1 may be initiated by a subscriber to an audio capture and control system, such as the COGI® system described in the incorporated references. Generally, the initiator may be a subscriber to such a system. The initiator may access the system over the Internet by logging in and starting a session. Audio may be captured 1 and passed through a gateway 3 to an Internet server 4 with database 5, executing a capture and control program for audio streams. Gateway 3 may take several forms. The capture system may be a microphone connected to a telephone, or a speakerphone, and the gateway may be a cellular or landline telephone interface, wherein the server answers a call on a given number and captures audio. Alternatively, the gateway may be over the Internet, such as a microphone enabled Internet appliance opening an audio capture capable browser window (e.g. Skype or others) or other audio enabled connection to the server.

Server 4 accepts commands from users who are subscribers of the service by way of an application running on a user PED, which may be an Internet appliance, 1a through 1n for as many users as are attending the event. The appliance may be capable itself of audio and video capture. The application provides a user interface and accepts user commands some of which may execute on the appliance as well as others relayed to the server over the Internet 7. Each user creates their own personally embellished version of the event for later retrieval. User control functions may include selecting portions of the audio stream for recording, adding video capture, and transcription, as well as annotating selected portions of the audio stream with additional data including comments, speaker identification, images, contact tags, hashtags, and metadata tags. The user may access from the server, selected and/or annotated data sets from the event at a later time. Thus a user who is a subscriber of the control system may access the server control functions for an event that is being captured by the system, thereby joining the event in the ability to perform the functions above.

The initiator may wish to make it possible for system subscribers who are in the vicinity of the event to have access to the control functions for the event. Thus the server may also include an authorization engine 6. Authentication may be based on a variety of parameters, including verification that a user is in a position to hear the audio event. For verification purposes the audio control system may include a variety of information about the location of the audio event. In some embodiments authentication may include known user telephone number when the appliance is a mobile phone. PEDs capable of running the system application may have location services including GPS, cellular, Bluetooth, or local Wi-Fi address. Thus the system may access these services through the PED application and compare the user location to the known position of the event.

Another way the system may verify proximity is comparison of local captured audio signal characteristics with the audio stream at the server to verify the user is in audio range of the event, when the mobile appliance has audio capture capability, which many do. The initiator/owner of the audio event may also choose to limit participants by locking the event, requiring event originator authorization, such as access codes. Originator authorization could work in concert with the other techniques, such as making it possible to enter a code only when the system has already determined that the user is in the vicinity of the event.

In some embodiments the authorization process may include running the user appliance application in a background mode. The application may monitor one or more of location and ambient audio, checking periodically with the server. Upon determining occurrence of an event in the user's vicinity, the application may notify the user with information about the event and/or an invitation to join.

Figure 2:
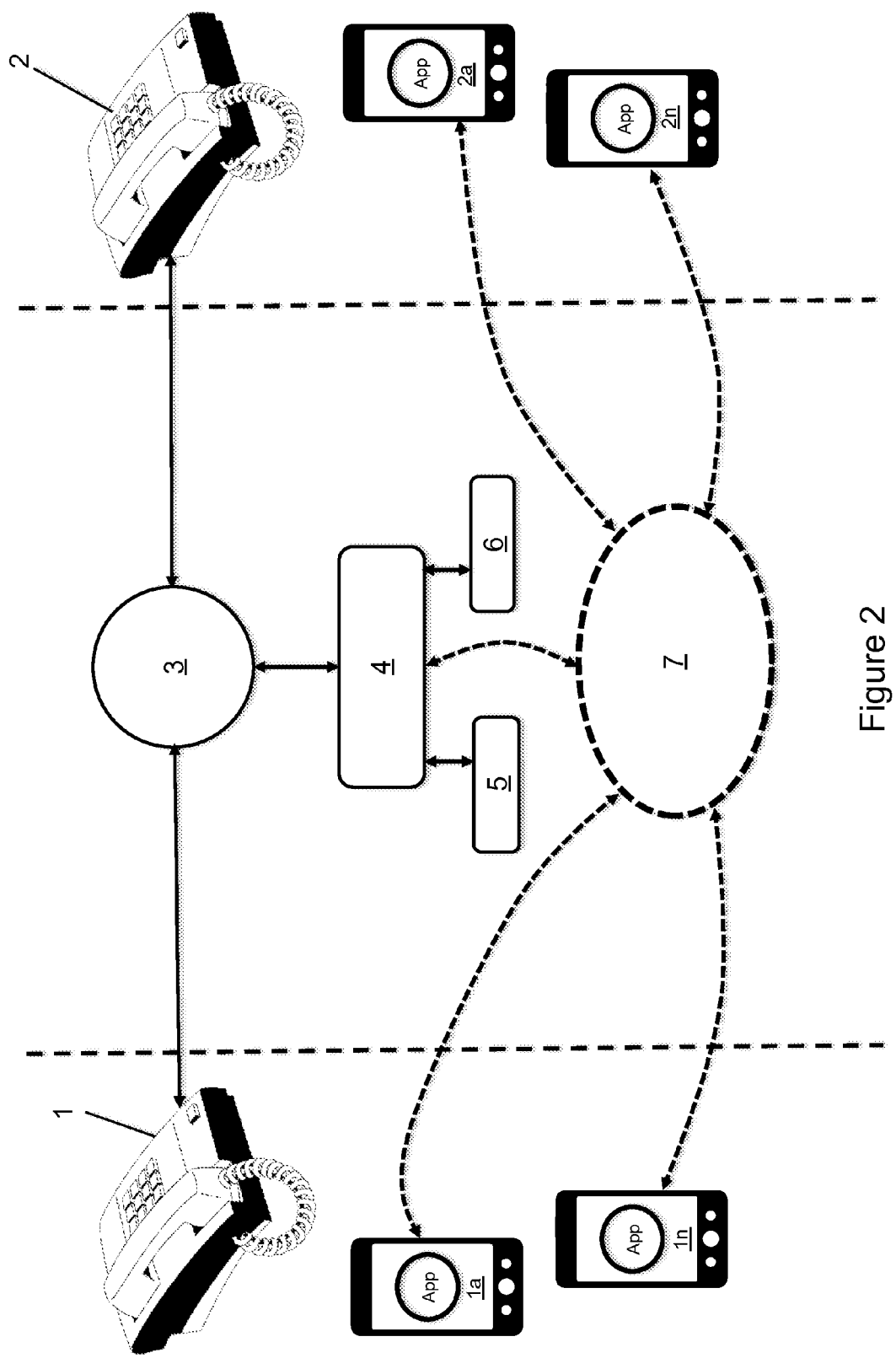
FIG. 2 is a block diagram of another COGI® scenario according to an illustrative embodiment of the invention.

Referencing FIG. 2, the system audio authentication 6 may be performed in a variety of ways to ensure that the audio picked up on any of the secondary devices (e.g. 1n) is identified as the audio is being streamed to the server 4 from phone 1 and phone 2. Various signal processing techniques can be used in order to determine the correlation between the server 4 audio signals and the audio stream that is being analyzed on device or devices 1n. These signal processing techniques must account for differences in signal bandwidth, sampling rate, cadence, noise, etc. For example, some signals may be restricted to 8 kHz sampled audio (e.g. telephony audio) and are to be correlated with higher sampled data (e.g. 16 kHz, 44.1 kHz or 48 kHz audio) on device 1n. The authentication process must handle these differences while providing an extremely high level of correlation that the signals from the server 4 and those picked up on the device 1n are indeed from the same audio sources (speakers).

FIG. 2 depicts another scenario. In this case the audio event is captured by a suitable telephone, such as a conference speakerphone type. The speakerphone 1 may call another telephone 2 to add in remote teleconferencing. In some embodiments the call may be routed through gateway 3, which in this case may be the landline telephone system (e.g. PBX) or network (e.g. PSTN) to the server, and the call to the remote phone may for some embodiments be routed through the server. For instance the initiator may dial a number which connects him to the server 4, which in turn dials the remote phone 2, with the two way, or multi-way if other phones are conferenced in, conversations passing through the server. The server process may include capturing the two-way (or multi-way for conferencing solutions where more than two audio streams are being streamed to the server) audio stream for access by subscribers. In this case the server will usually know the physical location of both telephones as well as any other information the initiator decides to provide, such as Wi-Fi address, etc. Any system subscribers at either location may be authorized to join the event by way of the authorization options described above.

Figure 3:
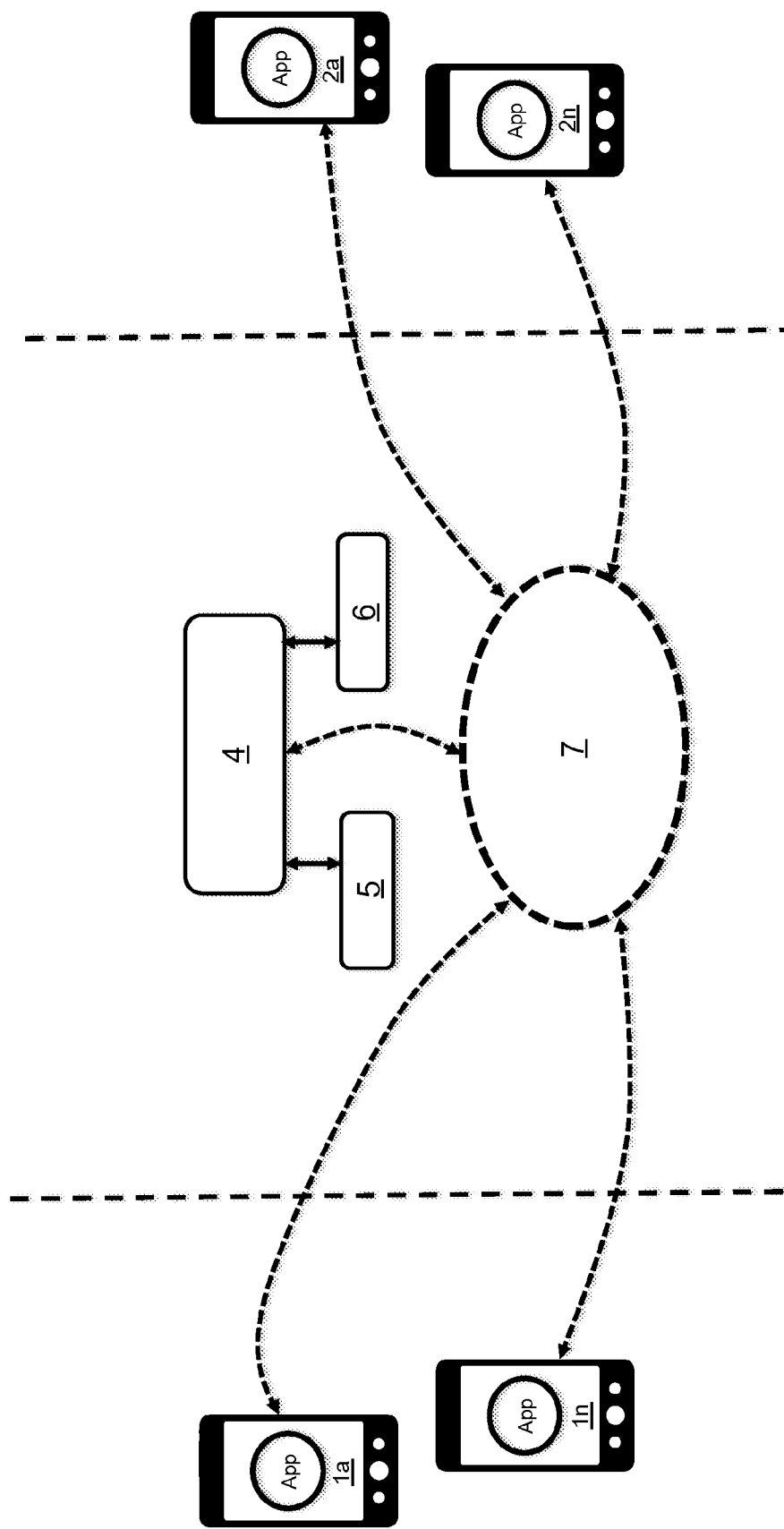
FIG. 3 is a block diagram of another COGI® scenario according to an illustrative embodiment of the invention.

Remote conferencing may also take place over the Internet as opposed to by phone, using services such as Skype, GoToMeeting, Facetime and others. This scenario is shown in FIG. 3. In this case two possibilities may occur. A bridge between the Internet (e.g. Skype, etc.) conference connection and the server may be available. In that case the initiator will provide location and other information to the server by logging in, and local authorization on both ends may take place. Alternatively, the initiator may independently connect to the server with either his appliance or another device with audio capture capability, thereby monitoring the event independently in parallel with the conference connection. Authorization of users at both ends will still be available using some or all of the above techniques.

Referring to FIG. 2 in another scenario, an alternate mechanism for identification of an active audio event can be constructed via a network broadcast method. That is, device 1a could broadcast via Bluetooth, for example, that an audio event is active. The primary user on device 1a initiates an audio event between phone 1 and phone 2. Device 1a also broadcasts via Bluetooth status of this audio event. Other devices (e.g. 1n) that are within range of the event, device 1a or phone 1 can receive the Bluetooth message and initiate the audio authentication protocol to verify that device 1n is within range of the audio event but is also able to hear (listen to) the audio event. Note also that the other devices (e.g. 1n) could initiate communication with the primary user to affect the same notification. That is, rather than device 1a broadcasting its status of this audio event, other devices could periodically broadcast their potential to join, allowing the device 1a to respond accordingly with status of an active audio event.

Other notification methods could include use of the COGI® application tagging mechanism, where the primary user on 1a has contact information for other potential participants such as phone number and email address. If a user on the COGI® system is tagged in the initiating party's application (e.g. app on device 1a), the tagged party's application (for example on device 1n) could be signaled by the server 4 to indicate potential inclusion in the audio event. The tagged party's app could then initiate audio authentication to ensure that device 1n is within range of the audio event to be authenticated. Note that a device 1n could be within range of an audio event at either or any side of a telephone connection or conference bridge. Once authenticated, the user associated with device 1*n* would be notified of the potential to join the COGI® session, thereby allowing user on device 1*n* to independently mark audio highlights, add images, text, video clips, etc. to their session's content, with the audio highlights being extracted from the original audio event established between phone 1 and phone 2, in this example.

In the same manner as described above [28], the phone number associated with device 1*n* or a PIN (personal identification number) that is provided to a new, prospective user could be used to identify to that application to initiate the authentication, notification and joining process as described. This PIN could be conveyed to participants associated with the event via email, voice prompts, etc. As with other embodiments, audio authentication ensures that this new participant can hear the audio event.

Referring to FIG. 2, the phone number associated with phone 1 could be used by server 4 to identify previous COGI® sessions that utilized that phone 1. Given the potential for that same user participating in the call between phone 1 and phone 2, a message from server 4 to a device's (e.g. 1*n*) app could be used to indicate the potential for joining that COGI® session. When the app on device 1*n* receives the message from server 4, the app can initiate the authentication process to determine if notification is appropriate to the user associated with device 1*n*.

Referring to FIG. 2, device 1*a* may not have a cellular telephony capability (e.g. tablet device) but is running the COGI® software application and can access the Internet. In this scenario, the application can be used to establish a call between phone 1 and phone 2, where the application on non-cellular device 1*a* notifies server 4 to establish the telephone connection between phone 1 and phone 2. All control for the COGI® highlight features is initiated in device 1*a*, even though the telephone connection is between the two physical phones 1 and 2.

Notification can be extended once a given party has been identified and authenticated. From FIG. 2, if device 2*a* is identified and authorized to join the COGI® session, device 2*a* may broadcast a message, via Bluetooth for example, to notify and initiate the other devices in close proximity (e.g. device 2*n*) that an active COGI® session is near. That signal then can initiate the authentication process on that device, and if successful, alert (notify) the user of device 2*n* that they can join the COGI® session in progress. At this point, this new user (2*n*) can control the highlighting of the shared event audio via the control functionality of the COGI® app running on that device 2*n*. Audio highlights are stored on server 4 for eventual access by that user (2*n*) through the COGI® session portal.

In referencing all newly joined users (e.g. 1*n*) that have followed the proximity and authentication mechanisms described herein, there can be use cases where the system determines that the audio signal from that newly joined user 1*n* can be and should be used as the primary audio stream for that user 1*n* or other users attached to the COGI® session. For instance the telephone audio stream may be limited to the 8 kHz PSTN bandwidth while some PEDs may have higher bandwidth, higher fidelity audio pick-up capabilities. Some current smartphones, for example, can capture audio at high sampling rates such as 44.1 kHz or 48 kHz. The COGI® system may determine that based on all microphone sources (e.g. 1*a* through 1*n*, phone 1, phone 2, etc.), a specific audio source may be active. This system identification allows the users to capture the COGI® audio event from a different source, improving the usefulness of the event. One example is the determination of a specific student in a lecture hall that is asking a question and to use the audio from that student or those in close proximity to represent the best audio signal for that COGI® audio event.

The COGI® session may employ different software means to determine usefulness of audio stream content, for example using automatic speech recognition (ASR) systems, in the selection of optimal audio stream. One example includes the use of local audio signals, sampled at higher bitrates (e.g. 48 kHz) which enables state-of-the-art ASR engines to more accurately identify content (i.e. recognize and convert audio into speech). The COGI® system relies on this system of devices (1*a* to 1*n*) to perform the necessary analysis in order to extract the maximum amount of valuable or cogent content for one or more participants from the COGI® audio event.

Another use for this system of audio streams that comprises the COGI® audio event is the use of what one could call "crowd sourced identification". That means that the COGI® system could use varied heuristics to determine the value of specific audio source contributing to COGI® audio event. One example could be the use of other, local participants to the COGI® session in the determination of primary audio stream for a given COGI® audio event. The system is comprised of a potential multitude of audio sources and control streams from the apps running on 1*a* to 1*n* at a given location. By correlating audio highlights (from the various apps on 1*a* and 1*n*) with active media sources, a value could be associated with a given and specific audio stream. The notion here is that if a local participant to a given audio stream is highlighting that content, by definition the audio is important, and that can also validate that a specific source (and likely the best quality source) is the ideal source for the COGI® audio event.

Other signal processing techniques can be employed to determine optimal source for the COGI® audio event including background noise, number of active speakers, or signal-to-noise, where the "noise" may be an alternate user's speech.

In other examples, the COGI® session may capture ALL of the recorded audio from one or more participant audio streams in order to maximize the value of the COGI® audio event. This process may require the server 4 to capture not just the audio highlights, as determined by various users associated with the system, but capture all of the additional audio, expanding the usefulness of a COGI® audio event to all participants.

The embodiments described herein are exemplary. Modifications, rearrangements, substitute devices, processes, etc. may be made to these embodiments and still be encompassed within the teachings set forth herein.

The invention claimed is:

1. A process for remote control of audio streams, comprising;
   initiating an audio event by an originator using a subscription audio capture and control system;
   configuring the audio event to allow users of the subscription audio capture and control system within verified proximity of the audio event to be authenticated to join the event;
   capturing and digitizing a broadcasted audio stream for the audio event,
   sending the captured audio stream of the audio event to a server based program,
   providing control functions to the users for processing the audio stream according to user preferences, providing Internet appliance applications to the users for accessing the control functions on the server, and;

authenticating the users within verified proximity of the audio event to the server to use the control functions on the server on the captured audio stream for the audio event.

2. The process of claim 1, wherein the control functions include;

selecting portions of the audio stream for at least one of recording, video capture and transcription, annotating selected portions of the audio stream with additional data including comments, speaker identification, images, contact tags, hashtags, and metadata tags and, accessing from the server, selected and/or annotated data sets from the audio event at a later time.

3. The process of claim 1, wherein authentication of users within verified proximity of the audio event one or more of;

known user telephone number when the appliance is a mobile phone, user location, by way of locating methods including GPS, cellular, Bluetooth, local Wi-Fi address, compared to the known position of the audio event, when the mobile appliance has location finding capability, comparison of local captured audio signal characteristics with the audio stream at the server to verify the user is in audio range of the audio event, when the mobile appliance has audio capture and capability, or;

event originator authorization, including access codes.

4. The process of claim 1 further comprising;

capturing the audio stream on a speakerphone wherein the speakerphone is on a call to a phone in a second locality, acquiring the audio stream on the server through a telephone connection to the server, and;

broadcasting the audio stream at the second locality, and, allowing authentication of user appliances at the second locality to access the control functions on the server.

5. The process of claim 4 wherein the phone call is routed through the server by way of the audio event originator dialing into the server and the server dialing the destination user and the call connection is made through the server.

6. The process of claim 3 further comprising running the user appliance application in a background mode, and upon determining occurrence of an audio event in the user's vicinity, prompting the user with information about the event.

7. The process of claim 3 further comprising notifying a tagged user about the audio event and inviting that user to join if within range.

8. The process of claim 1 wherein the audio stream may be additionally acquired from one or more of the authenticated user's devices.

* * * * *